(12) United States Patent
Take et al.

(10) Patent No.: US 8,920,907 B2
(45) Date of Patent: Dec. 30, 2014

(54) RESIN MOLDED ARTICLE AND DISPLAY DEVICE

(75) Inventors: Nobuyuki Take, Higashiosaka (JP); Tsuneo Matsui, Sanjo (JP)

(73) Assignees: SANYO Electric Co., Ltd., Moriguchi-shi (JP); Kyowa Industrial Co., Ltd., Sanjo-shi (JP)

( * ) Notice: Subject to any disclaimer, the term of this patent is extended or adjusted under 35 U.S.C. 154(b) by 394 days.

(21) Appl. No.: 13/405,630

(22) Filed: Feb. 27, 2012

(65) Prior Publication Data

US 2012/0219757 A1 Aug. 30, 2012

(30) Foreign Application Priority Data

Feb. 28, 2011 (JP) ................. 2011-043025

(51) Int. Cl.
*B32B 3/00* (2006.01)
*B32B 3/26* (2006.01)

(52) U.S. Cl.
CPC ............ *B32B 3/263* (2013.01); *B32B 2457/20* (2013.01)
USPC .......................................... 428/156; 428/192

(58) Field of Classification Search
CPC ............. B32B 3/00; B32B 3/26; B32B 3/28; B32B 3/30; H04N 5/64; H04N 5/645; H04N 5/655; H02B 1/30

USPC .................. 428/156, 192; 348/787, 789, 836; 361/600

See application file for complete search history.

(56) References Cited

U.S. PATENT DOCUMENTS 4,382,523 A * 5/1983 Sekine et al. ................. 242/344

FOREIGN PATENT DOCUMENTS

| JP | 2005-288735 A | 10/2005 |
| JP | 2009-137087 A | 6/2009 |

OTHER PUBLICATIONS

Japanese Office Action dated Sep. 16, 2014, issued in corresponding Japanese Patent Application No. 2011-043025, w/English translation (6 pages).

* cited by examiner

*Primary Examiner* — Catherine A Simone
(74) *Attorney, Agent, or Firm* — Westerman, Hattori, Daniels & Adrian, LLP

(57) ABSTRACT

A resin molded article according to the present invention includes a base portion and an erected wall which is erected from the base portion, wherein, in an upper end surface of the erected wall, there is exposed a gate portion formed through an injection of a resin material during resin molding. Further, in an inner surface of the erected wall which is opposite from an externally-appearing side thereof, at opposite portions beside the gate portion, there is formed a reduction surface which gradually reduces the erected wall in wall thickness toward the upper end surface of the erected wall.

2 Claims, 4 Drawing Sheets

RESIN MOLDED ARTICLE AND DISPLAY DEVICE

CROSS-REFERENCE TO RELATED APPLICATIONS

This patent application claims priority from Japanese Patent Application No. 2011/43025, which is herein incorporated by reference.

BACKGROUND OF THE INVENTION

1. Field of the Invention

The present invention relates to resin molded articles, such as cabinets forming display devices.

2. Description of the Related Art

In general, a casing of a television receiver, as a display device, is formed from a front cabinet and a back cabinet which are coupled to each other, wherein the front cabinet is constituted by a front-surface wall having a larger opening for exposing a screen, and a peripheral wall surrounding the front-surface wall, for example.

Such a cabinet is fabricated through resin molding, using a die constituted by a pair of die members 91, 92 as illustrated in FIG. 7.

The pair of the die members 91, 92 are combined with each other to form a cavity 93 to be filled with a resin material, between both the die members 91, 92. This cavity 93 includes a first cavity portion 94 for forming a front-surface wall of a cabinet, and a second cavity portion 95 for forming a peripheral wall of the cabinet.

On the other hand, among resin molding methods using dies, there have been known direct-gate methods adapted to directly inject resin materials into a cavity 93 through a direct gate 9, as illustrated in FIG. 7, without providing a sprue or a runner.

In a case of performing molding for a cabinet, according to a direct-gate method, a resin material is flowed, at first, through a direct gate into a column-shaped space, the resin material is charged into this column-shaped space and is solidified therein, and a portion 8 thereof (hereinafter, referred to as a gate portion) is formed in an erected wall 7 forming a peripheral wall of the cabinet, as illustrated in FIG. 6.

With the direct-gate method, it is possible to save the resin material by an amount corresponding to the volume of a sprue or a runner.

However, as illustrated in FIG. 7, in a case of directly installing the direct gate 9 at the upper end of the cavity portion 95 for forming an erected wall and, further, injecting a resin material thereinto through the direct gate 9, particularly when the erected wall has a larger wall thickness, the resin material flows into the cavity portion 95 through the direct gate 9 along an unstable flow path, thereby inducing the problem of occurrences of drawbacks in the external appearance, such as flow marks on the surface of the resin molded article.

SUMMARY OF THE INVENTION

According to the present invention, there is provided a resin molded article including a base portion and an erected wall 4 which is erected from the base portion, wherein, in an upper end surface of the erected wall 4, there is exposed a gate portion 5 formed through an injection of a resin material during resin molding.

Further, in an inner surface 41 of the erected wall 4 which is opposite from an externally-appearing side thereof, at opposite portions beside the gate portion 5, there are formed reduction surfaces 51, 51 which gradually reduce the erected wall 4, in wall thickness, toward the upper end surface of the erected wall 4.

In a resin-molded-article fabricating method according to the present invention, a die for use in resin molding includes a cavity 63 for forming the erected wall 4 and, in this cavity 63, in a die surface for forming the inner surface 41 of the erected wall 4 which is opposite from the externally-appearing side, there are provided reduction-surface formation portions 67 for forming the reduction surfaces 51, 51 for gradually reducing the wall thickness of the erected wall 4 toward the upper end surface of the erected wall 4, at opposite portions beside the position at which the gate portion 5 is to be formed.

In the resin-molded-article fabricating method according to the present invention, a resin material is injected into the cavity 63, using a direct gate 6.

As a result thereof, the erected wall 4 is formed. At this time, due to the reduction-surface formation portions 67 in the cavity 63, the reduction surfaces 51, 51 are formed, in the inner surface 41 of the erected wall 4 which is opposite from the externally-appearing side, at opposite portions beside the gate portion 5, such that the reduction surfaces 51, 51 gradually reduce the wall thickness of the erected wall 4 toward the upper end surface of the erected wall 4.

DETAILED DESCRIPTION OF THE PREFERRED EMBODIMENT

Hereinafter, with reference to the drawings, there will be described, in detail, an embodiment where the present invention is applied to a display device, more specifically, to a television receiver.

Figure 1:
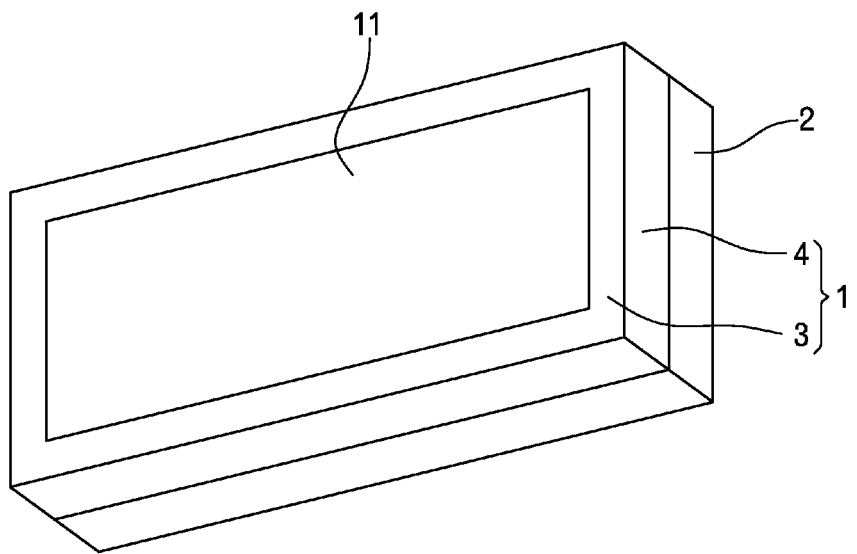
FIG. 1 is a perspective view of a television receiver to which the present invention should be applied.

As illustrated in FIG. 1, the television receiver according to an embodiment of the present invention includes a casing formed from a front cabinet 1 and a back cabinet 2 which are coupled to each other, wherein the front cabinet 1 is constituted by a base wall 3 forming a front-surface wall having a large opening for exposing a screen 11, and an erected wall 4 forming a peripheral wall surrounding the front-surface wall.

Figure 5:
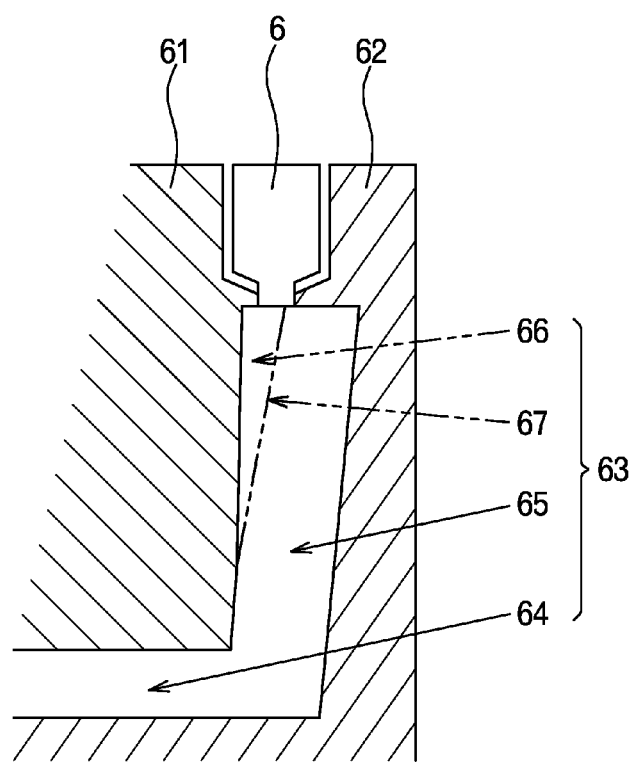
FIG. 5 is a cross-sectional view illustrating main portions of a die for use in resin molding according to the present invention.
Figure 6:
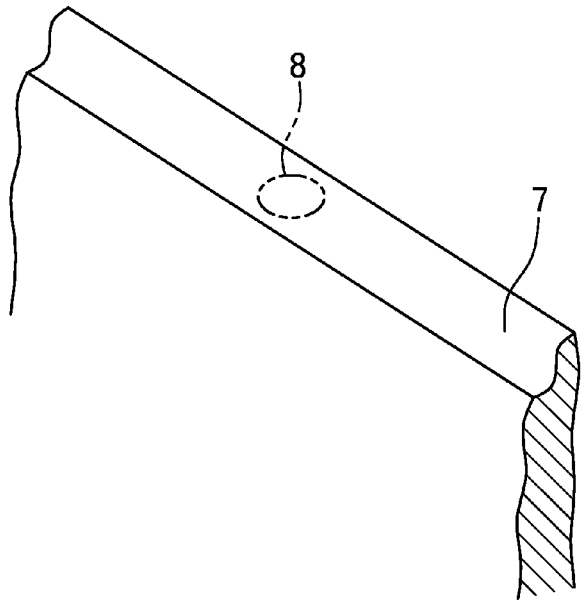
FIG. 6 is a perspective view illustrating a portion of a front cabinet in a related art.
Figure 7:
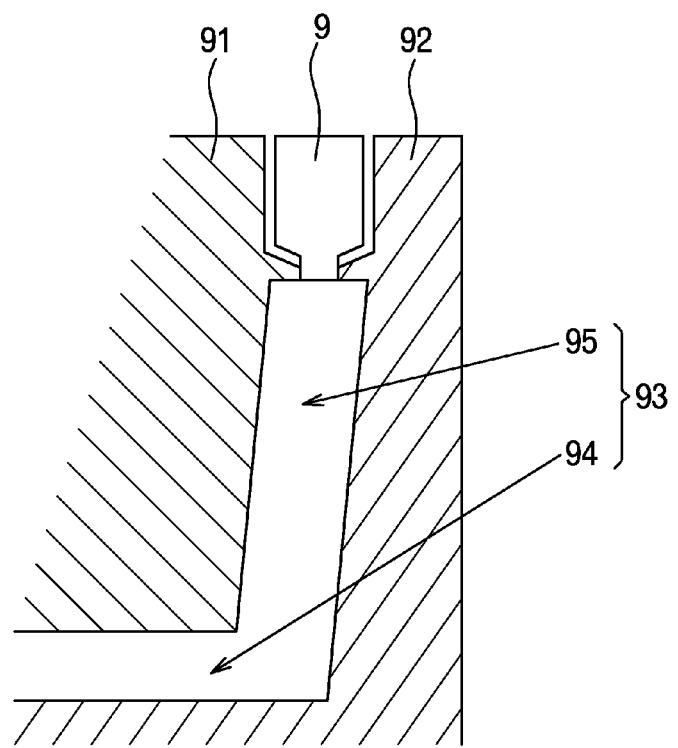
FIG. 7 is a cross-sectional view illustrating main portions of a die for use in resin molding in a related art.

The front cabinet 1 is fabricated, through resin molding according to a direct gate method, using a die constituted by a combination of a pair of die members 61, 62 illustrated in FIG. 5.

In resin molding processing, the pair of the die members 61, 62 are combined with each other to form a cavity 63 between both the die members 61, 62, and a resin material is directly injected into the cavity 63 through a direct gate 6.

Further, in resin molding for the front cabinet 1 illustrated in FIG. 1, a resin material is injected into the cavity 63 through plural direct gates 6.

Figure 2:
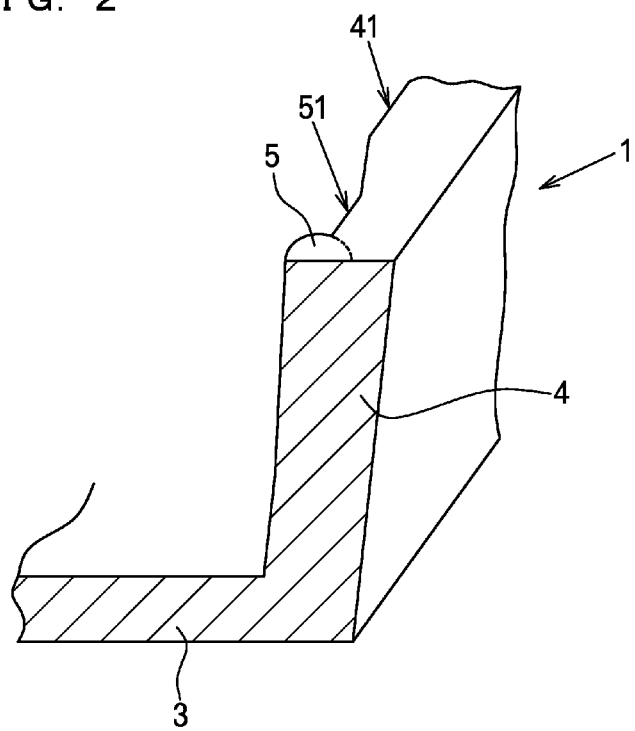
FIG. 2 is a partially-broken perspective view of a front cabinet to which the present invention is applied.
Figure 3:
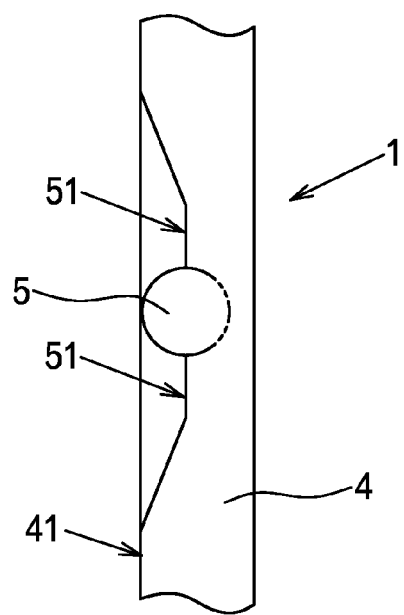
FIG. 3 is a plan view illustrating main portions of the front cabinet.
Figure 4:
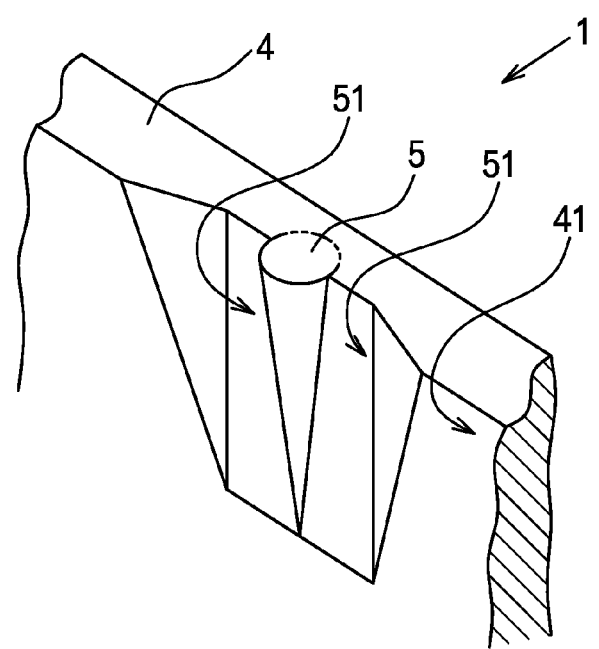
FIG. 4 is a perspective view illustrating main portions of the front cabinet.

FIGS. 2 to 4 illustrate portions around a gate portion 5 formed through the injection of the resin material through the direct gate, in the front cabinet 1 formed through the resin molding using the die.

The front cabinet 1 includes the erected wall 4 which is erected from the base wall 3 as described above, wherein, in the upper end surface of this elected wall 4, there is exposed the gate portion 5 formed through the introduction of the resin material during the resin molding.

In the inner surface 41 of the erected wall 4 which is opposite from its externally-appearing side, there are formed reduction surfaces 51, 51 which gradually reduce the wall thickness of the erected wall 4 toward the upper end surface of the erected wall 4, at opposite portions beside the gate portion 5.

The reduction surfaces 51, 51 are formed from inclined surfaces intersecting, at a small angle, with the inner surface 41 of the erected wall 4, arc-shaped surfaces smoothly continuous with the inner surface 41, or a combination of such inclined surfaces and arc-shaped surfaces. There is no level difference at the boundary portions between the reduction surfaces 51, 51 and the inner surface 41.

Further, the gate portion 5 protrudes, at a portion thereof, from the reduction surfaces 51, 51, and this protruding portion is positioned at its vertex on the inner surface 41 of the erected wall 4 and exposes an inverted-conical-shaped outer peripheral surface extending in a fan shape from this vertex toward the upper end surface of the gate portion 5.

In order to perform resin molding for the front cabinet 1, the die illustrated in FIG. 5 is provided, in the cavity 63 thereof, with a gate-portion formation portion 66 for forming the gate portion 5.

Further, in this cavity 63, in the die surface for forming the inner surface 41 of the erected wall 4, there are provided reduction-surface formation portions 67 for forming the reduction surfaces 51, 51, at opposite portions beside the gate-portion formation portion 66.

In the processing for performing the resin molding for the front cabinet 1 using the die, since a second cavity portion 65 for forming the erected wall 4 is made narrower in the wall-thickwise direction, due to the reduction-surface formation portions 67, the resin material injected into the second cavity portion 65 through the direct gate 6 is flowed along the reduction-surface forming portions 67, thereby stabilizing the flow path thereof.

This can suppress the occurrence of drawbacks in the external appearance, such as flow marks induced during the resin molding for the front cabinet 1.

It should be noted that the configuration of each portion according to the present invention is not restricted to the embodiment described above, and those skilled in the art could make various modifications without departing from the spirit of the present invention described in the claims. Further, the present invention can be applied to various types of resin molded articles having erected walls, as well as to the front cabinets of television receivers.

What is claimed is:

1. A resin molded article comprising a base portion and an erected wall which is erected from the base portion,
   wherein, in an upper end surface of the erected wall, there is exposed a gate portion formed through an injection of a resin material during resin molding, and
   in an inner surface of the erected wall which is opposite from an externally-appearing side thereof, at opposite portions beside the gate portion, there is formed a reduction surface which gradually reduces the erected wall in wall thickness toward the upper end surface of the erected wait
   wherein the gate portion protrudes from the reduction surface, and this protruding portion is positioned at its vertex on the inner surface of the erected wall and exposes an inverted-conical-shaped outer peripheral surface extending in a fan shape from this vertex toward an upper end surface of the gate portion.

2. A display device employing the resin molded article according to claim 1.

* * * * *